United States Patent
Kang

(10) Patent No.: US 7,953,998 B2
(45) Date of Patent: May 31, 2011

(54) CLOCK GENERATION CIRCUIT AND SEMICONDUCTOR MEMORY APPARATUS HAVING THE SAME

(75) Inventor: Jong-Ho Kang, Gyeonggi-do (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 933 days.

(21) Appl. No.: 11/878,904

(22) Filed: Jul. 27, 2007

(65) Prior Publication Data

US 2008/0288806 A1  Nov. 20, 2008

(30) Foreign Application Priority Data

May 14, 2007 (KR) .................. 10-2007-0046405

(51) Int. Cl.
  G06F 1/00      (2006.01)
  G06F 1/04      (2006.01)
  G06F 13/00     (2006.01)
  H03K 19/0175   (2006.01)
  H03K 3/84      (2006.01)
  H03K 3/00      (2006.01)
  H03L 7/00      (2006.01)
  G11C 7/00      (2006.01)
  H04L 7/00      (2006.01)

(52) U.S. Cl. ......... 713/500; 713/501; 713/600; 326/63; 327/141; 327/164; 327/291; 365/189.011; 375/354; 711/100

(58) Field of Classification Search .................. 713/500, 713/501, 600; 326/63; 327/141, 164, 291; 365/189.011; 375/354; 711/100
See application file for complete search history.

(56) References Cited

U.S. PATENT DOCUMENTS

| | | | |
|---|---|---|---|
| 5,142,247 A * | 8/1992 | Lada et al. ............... | 331/14 |
| 6,029,250 A | 2/2000 | Keeth | |
| 6,510,095 B1 * | 1/2003 | Matsuzaki et al. ......... | 365/222 |
| 6,654,898 B1 * | 11/2003 | Bailey et al. ............. | 713/500 |
| 6,687,322 B1 * | 2/2004 | Zhang et al. ............. | 375/376 |
| 6,912,680 B1 | 6/2005 | Keeth | |
| 2002/0000853 A1 * | 1/2002 | Chen et al. ............... | 327/156 |
| 2002/0104031 A1 * | 8/2002 | Tomlinson et al. ........ | 713/320 |
| 2006/0066759 A1 | 3/2006 | Ikuma et al. | |
| 2006/0145741 A1 * | 7/2006 | Panpalia et al. ........... | 327/158 |
| 2007/0147106 A1 * | 6/2007 | Kyung ..................... | 365/148 |

FOREIGN PATENT DOCUMENTS

| | | |
|---|---|---|
| JP | 4107011 | 4/1992 |
| JP | 11-312400 | 11/1999 |

* cited by examiner

*Primary Examiner* — Stefan Stoynov

(74) *Attorney, Agent, or Firm* — Venable LLP; Jeffri A. Kaminski

(57) ABSTRACT

A clock generation circuit for a semiconductor memory apparatus includes an internal clock generation unit that receives a clock and generates an internal clock, and a clock selection unit that selectively outputs the clock or the internal clock in response to a selection signal.

7 Claims, 4 Drawing Sheets

US 7,953,998 B2

CLOCK GENERATION CIRCUIT AND SEMICONDUCTOR MEMORY APPARATUS HAVING THE SAME

CROSS-REFERENCE TO RELATED PATENT APPLICATION

This application claims the benefit of Korean Patent Application No. 10-2007-0046405, filed on May 14, 2007, in the Korean Intellectual Property Office, the disclosure of which is incorporated herein in its entirety by reference.

BACKGROUND OF THE INVENTION

1. Technical Field

The present invention relates to a semiconductor memory apparatus, and in particular, to a clock generation circuit and a semiconductor memory apparatus having the same.

2. Related Art

As shown in FIG. 1, a semiconductor memory apparatus includes a data output unit 10 that outputs data Data in response to a clock clk, and a data input unit 20 that receives the data Data in response to the clock clk.

The clock clk is commonly input to the data output unit 10 and the data input unit 20. Further, the clock clk is used by other circuits of the semiconductor memory apparatus. Accordingly, as the number of internal circuits of the semiconductor memory apparatus that use the clock clk becomes large, the clock clk may be distorted from the original waveform.

Meanwhile a high-speed semiconductor memory apparatus requires an increase in clock frequency. Accordingly, a semiconductor memory apparatus using a high-frequency clock is sensitive to the clock as compared with a semiconductor memory apparatus using a low-frequency clock. Therefore, the semiconductor memory apparatus using a high-frequency clock needs to use a stable clock free from distortion. For example, when the data output unit 10 and the data input unit 20 operate in response to a low-frequency clock, the clock used in the past can be used.

However, when the semiconductor memory apparatus uses a high-frequency clock, since the data output unit 10 and the data input unit 20 are sensitive to the clock frequency, in order to prevent an erroneous operation, a stable clock that has no distortion compared with the previously used clock is required.

SUMMARY OF THE INVENTION

Embodiments of the present invention provide a clock generation circuit that outputs a clock or an internal clock.

Embodiments of the present invention provide a semiconductor memory apparatus that selectively uses one clock of a plurality of clocks according to a clock frequency or a user's intention.

According to an embodiment of the present invention, a clock generation circuit of a semiconductor memory apparatus includes an internal clock generation unit that receives a clock and generates an internal clock, and a clock selection unit that selectively outputs the clock or the internal clock in response to a selection signal.

According to another embodiment of the invention, a semiconductor memory apparatus includes a clock generation unit that receives a clock and generates an internal clock, selectively outputs the clock or the internal clock as a first selection clock in response to a first selection signal, and selectively outputs the clock or the internal clock as a second selection clock in response to a second selection signal, a data output unit that outputs data in response to the first selection clock, and a data input unit that receives data in response to the second selection clock.

DESCRIPTION OF EXEMPLARY EMBODIMENTS

Hereinafter, an embodiment of a semiconductor memory apparatus to which a clock generation circuit is applied will be described in detail with reference to the accompanying drawings. At this time, an internal clock includes a PLL (Phase Locked Loop) clock or a DLL (Delay Locked Loop) clock. Further, a clock generation circuit and a semiconductor memory apparatus using the same will be described utilizing the PLL clock, but the invention is not limited thereto. In addition, even though the internal clock as the PLL clock will be described, the internal clock may be the DLL clock.

Figure 1:
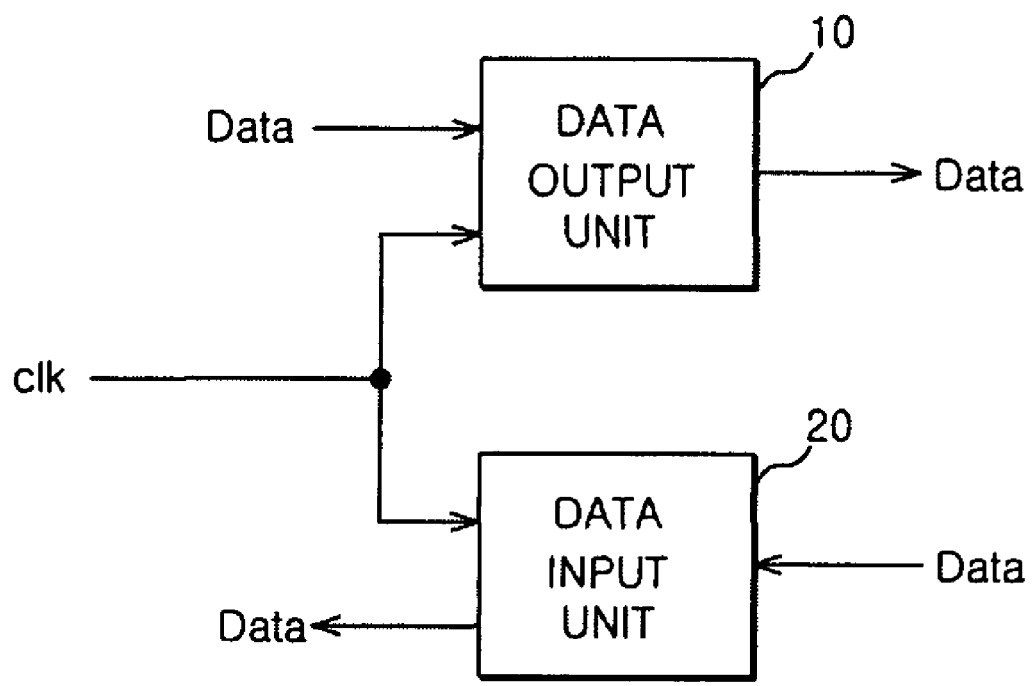
FIG. 1 is a block diagram of a semiconductor memory apparatus according to the related art.
Figure 2:
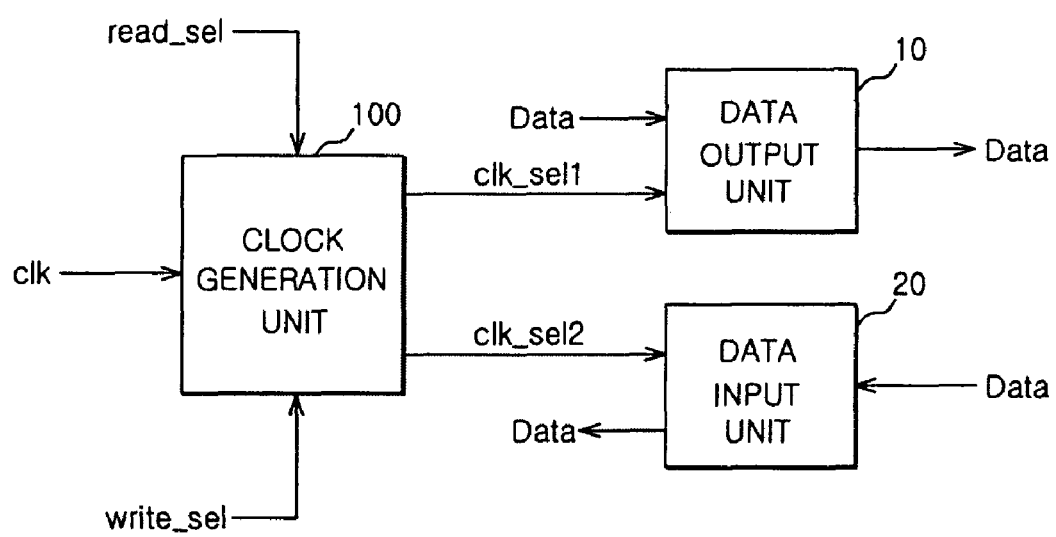
FIG. 2 is a block diagram of a semiconductor memory apparatus according to an embodiment of the present invention.

Referring to FIG. 2, a semiconductor memory apparatus according to an embodiment of the present invention includes a clock generation unit 100, a data output unit 10, and a data input unit 20.

The clock generation unit 100 receives the clock clk to generate a PLL (Phase Locked Loop) clock. The clock generation unit 100 selectively outputs the clock clk or the PLL clock as a first selection clock clk_sel1 in response to a first selection signal. For example, the first selection signal may be a read selection signal read_sel.

Further and the clock generation unit 100 selectively outputs the clock clk or the PLL clock as a second selection clock clk_sel2 in response to a second selection signal. For example the second selection signal may be a write selection signal write_sel.

The data output unit 10 outputs data Data in response to the first selection clock clk_sel1.

The data input unit 20 receives the data Data in response to the second selection clock clk_sel2.

Figure 3:
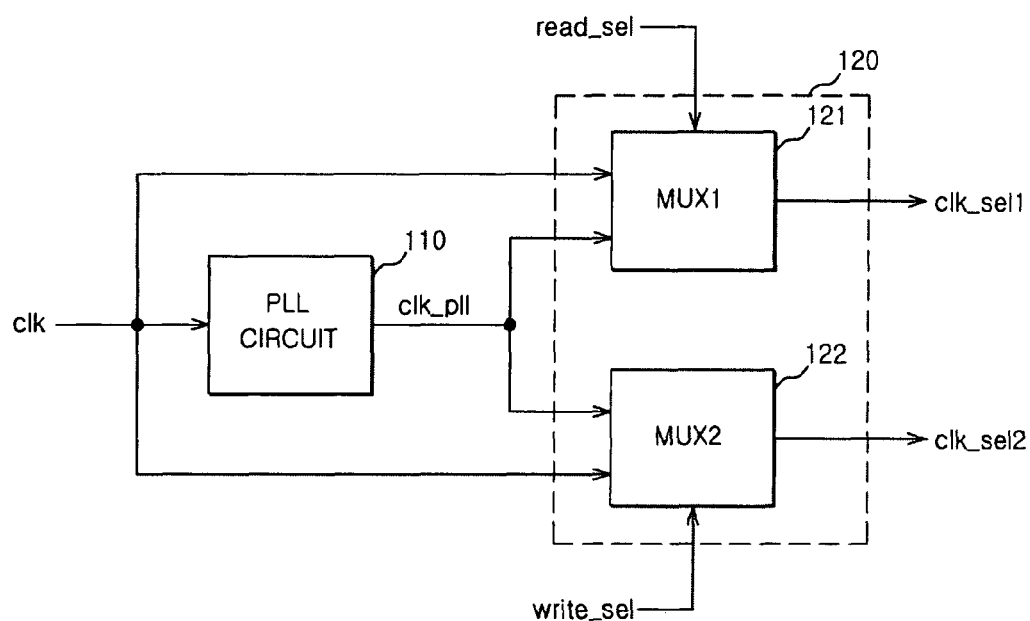
FIG. 3 is a circuit diagram showing a clock generation unit shown in FIG. 2.

FIG. 3 is a circuit diagram of a clock generation unit shown in FIG. 2. Hereinafter, an internal clock generation unit 110 is referred to as a PLL circuit 110.

The clock generation unit 100 includes a PLL (Phase Locked Loop) circuit 110 and a clock selection unit 120.

The PLL circuit 110 receives the clock clk to generate the PLL clock clk_pll.

The clock selection unit 120 outputs the clock clk or the PLL clock clk_pll as the first selection clock clk_sel1 in response to the first selection signal, for example, the read selection signal read_sel, and outputs the clock clk or the PLL clock clk_pll as the second selection clock clk_sel2 in response to the second selection signal, for example write selection signal write_sel. The PLL circuit 110 may use a general PLL circuit. The PLL circuit 110 may be used to maintain a uniform frequency of an output signal. That is, the output signal is maintained to a specific phase.

The clock selection unit 120 includes a first multiplexer (MUX1) 121 and a second multiplexer (MUX2) 122.

The first multiplexer (MUX1) 121 outputs the clock clk or the PLL clock clk_pll as the first selection clock clk_sel1 in response to the first selection signal, that is the read selection signal read_sel. In this case, the first multiplexer (MUX1) 121 provides the first selection clock clk_sel1 to the data output unit 10. Therefore, the first selection signal for selecting the first selection clock clk_sel1 may be called the read selection signal that relates to a data outputting operation.

The second multiplexer (MUX2) 122 outputs the clock clk or the PLL clock clk_pll as the second selection clock clk_sel2 in response to the second selection signal, that is the write selection signal write_sel. In this case, the second multiplexer (MUX2) 122 provides the second selection clock clk_sel2 to the data input unit 20. Therefore, the second selection signal for selecting the second selection clock clk_sel2 may be called the write selection signal that relates to a data inputting operation.

The operation of the semiconductor memory apparatus having the above-described configuration will now be described. At this time, even though the semiconductor memory apparatus, to which the clock generation circuit according to an embodiment of the present invention is applied, is exemplified as a data input/output circuit that receives or outputs data, the invention is not limited thereto.

According to the semiconductor memory apparatus according to an embodiment of the present invention, the PLL clock clk_pll can be selected as the clock clk that is input to the data output unit 10 and the data input unit 20 according to a clock frequency or a user's requirements.

As the frequency of the clock clk that is input to the semiconductor memory apparatus becomes high, the data output unit 10 and the data input unit 20 become sensitive to the clock clk. Accordingly, if the clock clk is distorted, the data output unit 10 and the data input unit 20 operate erroneously. In order to remove distortion of the clock clk, the clock clk is input to the PLL circuit 110, thereby generating the PLL clock clk_pll. The PLL clock clk_pll is input to the data output unit 10 and the data input unit 20, such that the data output unit 10 and the data input unit 20 operate stably.

Further, when the user requires high operation reliability and stability of the semiconductor memory apparatus, the PLL circuit 110 is applied to generate the PLL clock clk_pll, and the generated PLL clock clk_pll is input to the data output unit 10 and the data input unit 20.

Meanwhile, when the user requires a semiconductor memory apparatus having low power consumption, instead of operation reliability and stability, the clock clk is input to the data output unit 10 and the data input unit 20 instead of the PLL clock clk_pll.

The semiconductor memory apparatus according to an embodiment of the present invention can selectively input the clock clk or the PLL clock clk_pll to the data output unit 10 and the data input unit 20.

As such, the semiconductor memory apparatus needs to selectively use the PLL clock clk_pll or the clock clk in order to operate according to the clock frequency or the user's requirements. The read selection signal read_sel and the write selection signal write_sel are used to select the PLL clock clk_pll or the clock clk. Enabling/disabling of the read selection signal read_sel and the write selection signal write_sel are set, for example, by inputting associated information to mode registers through an MRS (Mode Register Set) command. Alternatively, the enabling/disabling of the read selection signal read_sel and the write selection signal write_sel may be set by disconnecting a fuse. If necessary, logic circuits that generate the read selection signal read_sel and the write selection signal write_sel, respectively, may be designed and used.

The semiconductor memory apparatus according to an embodiment of the present invention selectively uses the internal clock or the clock. As a result, stability of the semiconductor memory apparatus can be improved, and low current consumption can be achieved.

Figure 4:
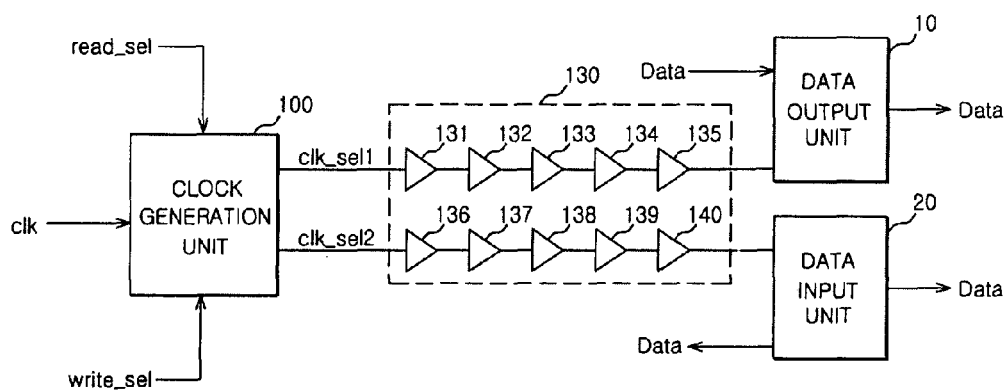
FIG. 4 is a block diagram of a semiconductor memory apparatus according to another embodiment of the present invention.

In addition, as shown in FIG. 4, a buffer unit 130 that has a plurality of operational amplifiers 131 to 140 for data buffering may be provided between the clock generation unit 100 and data output unit 10 and between the clock generation unit 100 and the data input unit 20.

It will be apparent to those skilled in the art that various modifications and changes may be made without departing from the scope and spirit of the invention. Therefore, it should be understood that the above embodiment is not limitative, but illustrative in all aspects. The scope of the invention is defined by the appended claims rather than by the description preceding them, and therefore all changes and modifications that fall within metes and bounds of the claims, or equivalents of such metes and bounds are therefore intended to be embraced by the claims.

What is claimed is:

1. A semiconductor memory apparatus comprising:
a clock generation unit that receives a clock to generate an internal clock, selectively outputs the clock or the internal clock as a first selection clock in response to a first selection signal, and selectively outputs the clock or the internal clock as a second selection clock in response to a second selection signal;
a data output unit that receives the first selection clock, and outputs data to an outside of the semiconductor memory apparatus in response to the first selection clock; and
a data input unit that receives the second selection clock, and receives data from the outside of the semiconductor memory apparatus in response to the second selection clock.

2. The semiconductor memory apparatus of claim 1, wherein the first selection signal is a read selection signal and the second selection signal is a write selection signal, the read selection signal and the write selection signal include low level and high level, respectively.

3. The semiconductor memory apparatus of claim 2, wherein the clock generation unit includes:
an internal clock generation unit that receives the clock to generate the internal clock, and
a clock selector that selectively outputs the clock or the internal clock as the first selection clock in response to the read selection signal, and selectively outputs the clock or the internal clock as the second selection clock in response to the write selection signal.

4. The semiconductor memory apparatus of claim 3, wherein the clock selector includes:
a first multiplexer that selectively outputs the clock or the internal clock as the first selection clock in response to the read selection signal, and
a second multiplexer that selectively outputs the clock or the internal clock as the second selection clock in response to the write selection signal.

5. The semiconductor memory apparatus of claim 3, wherein the internal clock generation unit includes a PLL (Phase Locked Loop) circuit.

6. The semiconductor memory apparatus of claim 1, further comprising:
a buffer unit disposed between the clock generation unit and the data input unit, and between the clock generation unit and the data output unit.

7. The semiconductor memory apparatus of claim 6, wherein the buffer unit includes a plurality of operational amplifiers connected in series.

* * * * *